June 1, 1965
W. N. FLETCHER
3,186,059
METHOD OF ROLL-FORMING METAL PRODUCT
Original Filed Oct. 27, 1961
4 Sheets-Sheet 1
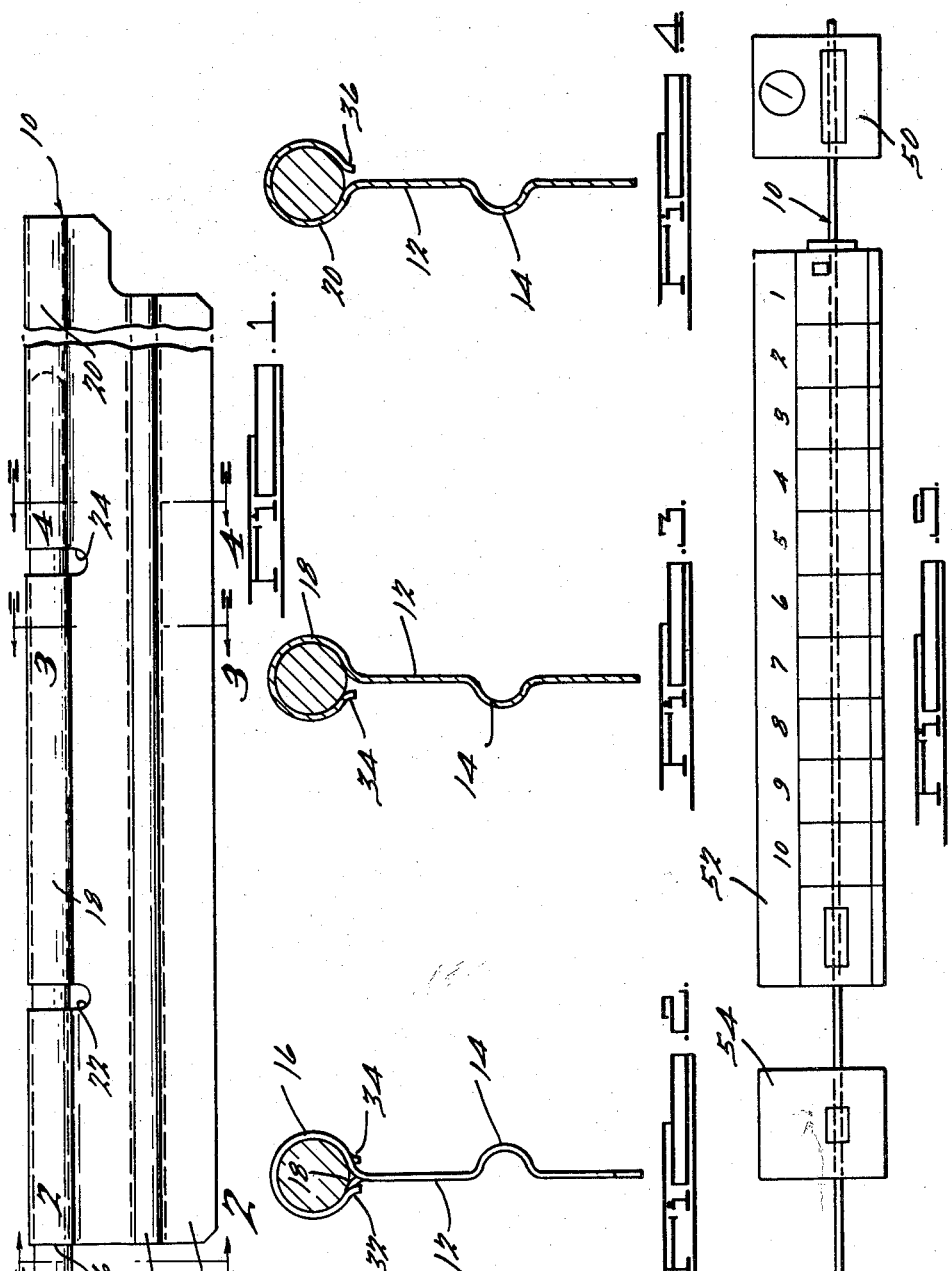
INVENTOR.
William N. Fletcher
BY
*Harness, Dickey & Pierce*
ATTORNEYS.

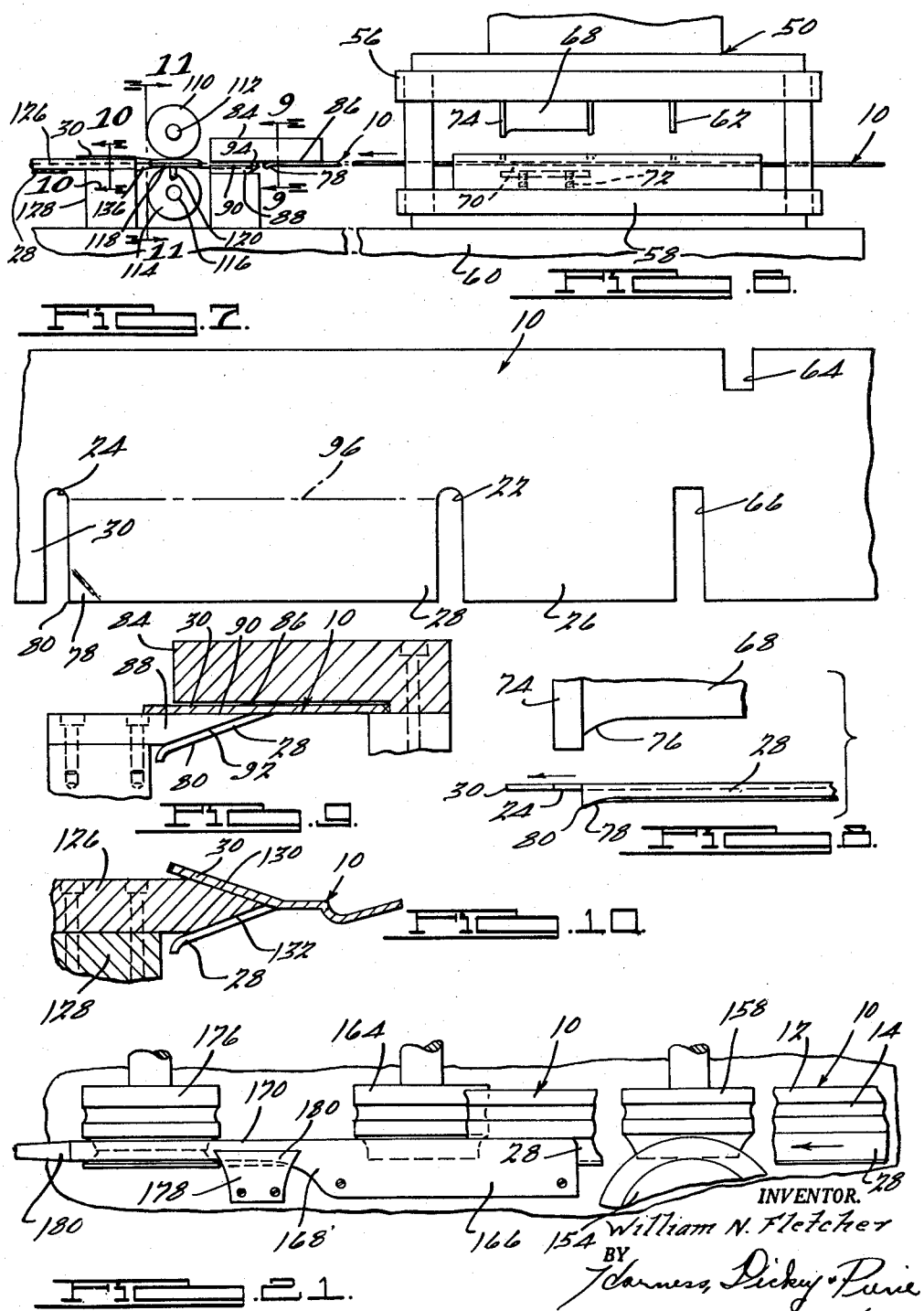

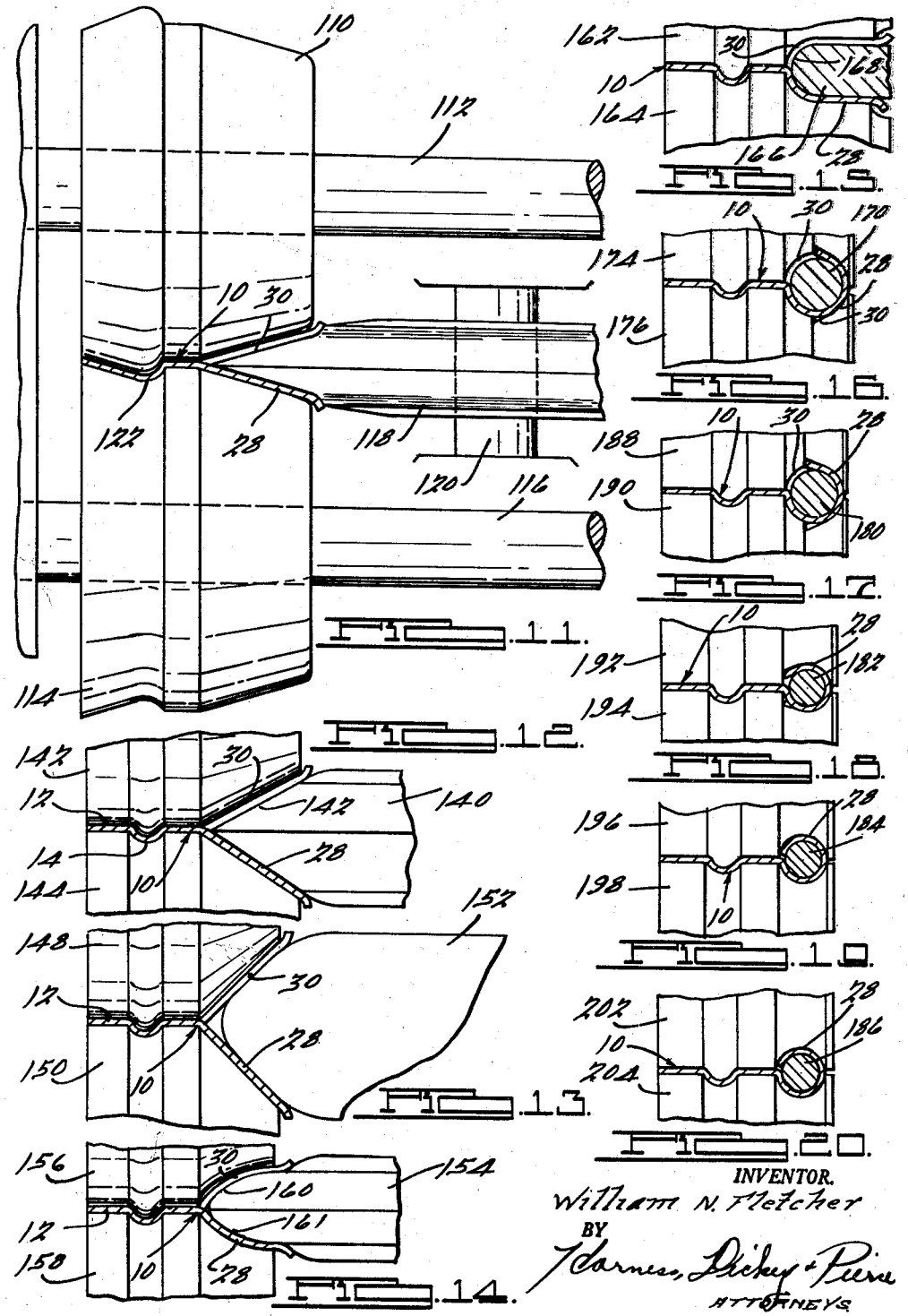

June 1, 1965    W. N. FLETCHER    3,186,059
METHOD OF ROLL-FORMING METAL PRODUCT
Original Filed Oct. 27, 1961    4 Sheets-Sheet 4
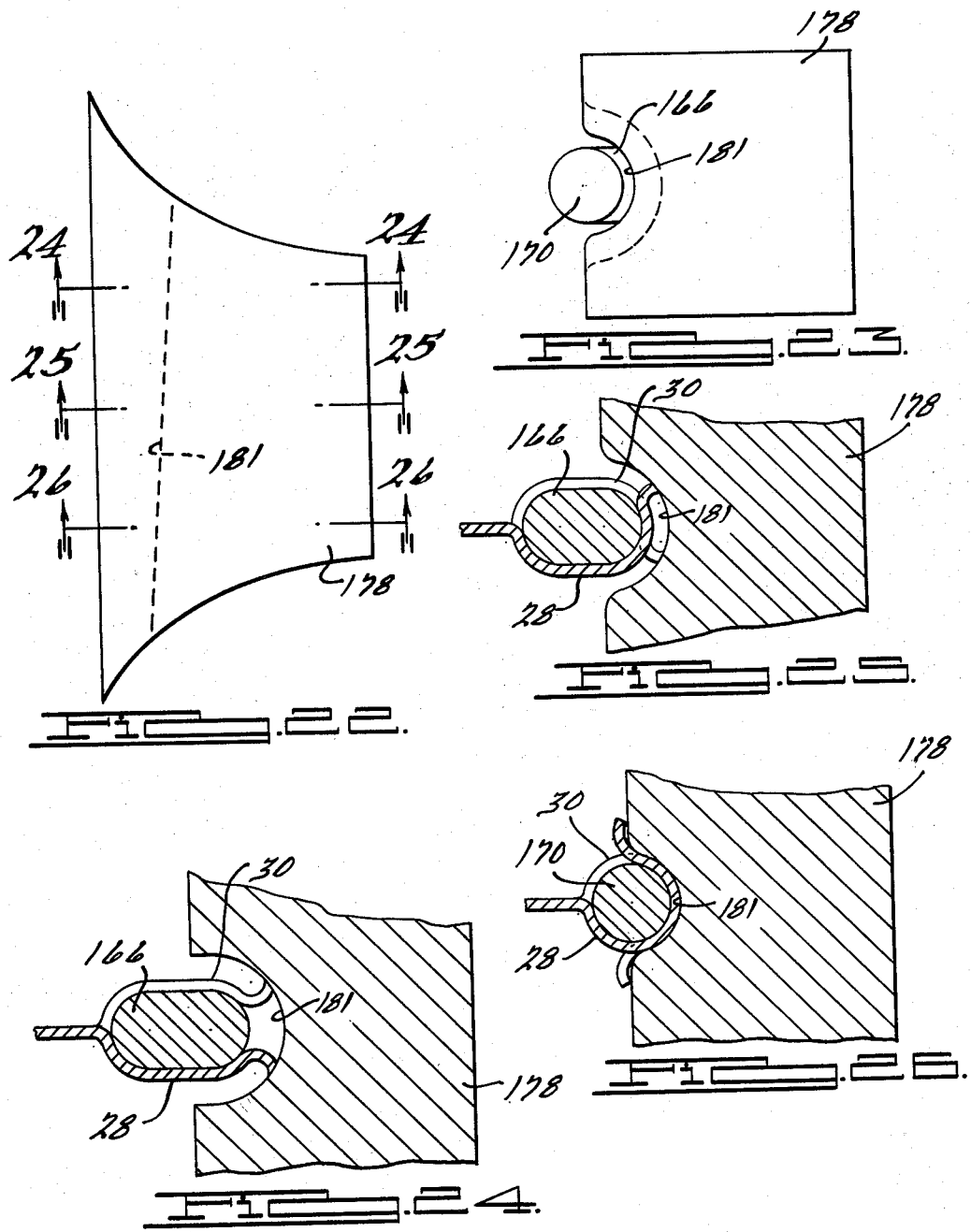
INVENTOR.
William N. Fletcher
BY
ATTORNEYS.

United States Patent Office 3,186,059
Patented June 1, 1965

3,186,059
METHOD OF ROLL-FORMING METAL PRODUCT
William N. Fletcher, Lathrup Village, Mich., assignor to Ternes Steel Company, Roseville, Mich., a corporation of Michigan
Original application Oct. 27, 1961, Ser. No. 148,229. Divided and this application Aug. 2, 1963, Ser. No. 299,649
6 Claims. (Cl. 29—11)

This invention is a division of my application Serial Number 148,229, filed October 27, 1961.

This invention relates to hinge means and the manufacture thereof; and more specifically, to a windshield visor hinge for vehicular use.

Vehicular windshield visors are commonly rotatably mounted at each side of a vehicle windshield. The visors are adapted for movement from an upper stowed position, substantially parallel to and lying flat against the vehicle roof, to a lower shielding position extending substantially vertically in front of the windshield or side windows. The visors are commonly mounted on a hinge element which takes the form of a substantially flat metal strip having means to fasten the visor thereto. A tubular opening is provided on the hinge element within which a rod, pivotally attached to the vehicle, is frictionally received. The tubular opening has previously taken a variety of forms and has been manufactured in a variety of ways. In general, the tubular opening frictionally receives the pivoted rod and is rotatable thereabout between the upper and lower position. Ideally and theoretically, a frictional fit is provided such that the visor will be frictionally retained in the upper position and any intermediate position unless a vehicle occupant exerts a rotative force on the visor. Obviously, the visor must be satisfactorily retained in its upper position during normal vehicular operating conditions so that the visor will not inadvertently rotate from the upper position to the lower position and interfere with the vision of a vehicle operator. Since it is critical that the visor be maintained in the upper position, previous visor hinge arrangements having an inherent frictional force differential in various adjusted positions have been designed to exert a maximum frictional force in the upper stowed position.

A type of visor hinge element having frictional force variations is manufactured by bending portions of a flat metal strip into a tubular configuration. The flat metal strip is slotted along an edge on which the tube is to be formed to provide a plurality of flat slotted sections separated by transverse slots and integrally connected to a common base section. Each of the slotted sections are formed into tubular configuration by similarly bending the outer edges of the flat slotted sections into a substantially cylindrical form. Since each tube section is similarly bent, all of them extend in the same direction and terminate at similar circumferential positions. Accordingly, a slot or opening is formed between the outer edge of each tubular section and the common base section to form a continuous longitudinal slot along one side of the hinge element. A rod frictionally mounted in the tubular sections requires a substantially different force application to cause rotation in one direction as compared with rotation in the other direction. Consequently, the frictional binding effect is decreased or lessened depending upon the direction of rotation of the hinge element relative to the rod. Since it is necessary and desirable, for safety reasons, to have the maximum binding effect applied when the visor is in the upper position, the hinge elements are installed in a particular manner to obtain that result. Accordingly, a right and left hand hinge must be provided for each vehicle since one hinge element is mounted on a rod element pivoted adjacent the left hand door and extending inwardly therefrom, and the other hinge element is mounted on a rod element pivoted adjacent the right hand vehicle door and extending inwardly therefrom. Therefore, special assembly procedures are required to insure that the right type of hinge is placed in the correct position in the vehicle and associated only with a right or left hand visor element. Furthermore, since a maximum frictional retaining force is obtained in one position and a minimum frictional force is obtained in another position, the windshield visor is often undesirably loose in, or close to, the lower position and undesirably tight in, or close to, the upper position.

Consequently, attempts have been made to design a visor hinge arrangement having equal frictional force retaining characteristics in all positions and, in which, an equal minimum amount of force is required to move the visor between varying positions. Some attempts have been made to produce such a visor hinge from multiple parts. However, such hinges are generally more costly to manufacture and more subject to wear in use resulting in undesirable visor looseness. In order to take advantage of the economies of manufacture and durability in use of a single piece friction-type hinge, it has previously been proposed to form such a hinge element by a stamping process. The hinge element is made from a piece of relatively heavy gauge strip stock which is slotted and formed into oppositely extending semi-cylindrical tube portions. In an attempt to control the undesirable effects of springback, the tubular sections are made relatively short in length and an extended series of six or more tubular sections are provided to insure sufficient surface contact area with the rod element to frictionally retain the visor in the adjusted positions. Because of the excessive number of tubular sections and corresponding slotted areas, the strength of the hinge element is materially reduced and the hinge elements are rather easily bent in handling prior to assembly, during assembly and in subsequent use. Furthermore, since the tubular sections are semi-cylindrical in design, assembly of the rod into the tubular opening is more difficult because of lack of sufficient peripheral support for the rod until the rod has passed through at least three of the semi-cylindrical sections. In automatic assembly of rod elements into the tubular sections, the rod elements become easily misaligned by slight movement away from the confining semi-cylindrical walls of the first two tubular sections of the extended series thereof. In assembly of the visor to the hinge element, a stitching operation is commonly used to secure the visor to the hinge element. The stitching operation comprises the insertion of staples through the visor and into the hinge element. When heavier gauge stock must be utilized for the hinge element in an attempt to control springback and to provide additional beam strength, the stitching operation becomes more difficult. Thus, in many respects a hinge element manufactured by a stamping process and having reversely bent semi-cylindrical tubular portions is unsatisfactory. This invention relates specifically to a new and improved tubular hinge form, and the method and apparatus for manufacturing the same.

It is, therefore, a principal objective of the present invention to provide a new and improved visor hinge arrangement producing more satisfactory results in use and being more economical to manufacture. A further object is to provide hinge means of the frictional locking type having uniform frictional locking characteristics in all positions of adjustment. Another object is to provide a vehicular sun visor hinge which may be manufactured as an integral unit from coil stock of lighter gauge steel than previous hinges and therefore requires less material and is lighter in weight. Still a further object is to provide a visor hinge having improved strength characteristics and having a design facilitating assembly operations and reducing assembly costs.

Another principal object of the present invention is to provide a hinge element manufactured by a roll forming operation from a single sheet of metal and having oppositely bent flange portions which form a tubular conduit. In this connection, it is another object to provide a method and means to roll form a tubular passage having a plurality of oppositely bent sections, each of which extend circumferentially approximately 360° in opposite directions. A still further object is to provide a new and improved method of roll forming a tubular passage in a single piece of sheet material. Similarly, another object is to provide novel apparatus for carrying out the aforementioned method.

In order to accomplish the aforementioned purposes and objects, friction type hinge means has been designed which provides equal frictional characteristics in all hinge positions and which provides a maximum frictional surface engagement area. In general, the hinge means is formed from a sheet metal blank having a series of transverse slots formed at predetermined intervals along one edge to divide the blank into a plurality of slotted sections integrally connected by a common base section. Alternate slotted sections are oppositely bent and formed into tubular portions of cylindrical shape and equal diameter located in coaxial alignment with one another. Accordingly, each of the slotted sections is bent circumferentially approximately 360° so that the outer end of each slotted section is displaced circumferentially approximately 360° and terminates closely adjacent the base section of the blank from which it was bent. The total inner peripheral surface area of all of the tubular sections bent in one direction is approximately equal to the total inner peripheral surface area of all of the tubular sections bent in the other direction. Consequently, a hinge arrangement is provided wherein equal frictional forces are applied to a rod, inserted into the tubular sections and frictionally retained thereby, in any adjusted position regardless of the direction of rotation of the hinge element about the rod element.

In order to manufacture the aforedescribed hinge means, a novel manufacturing method and apparatus have been developed. The novel method includes a roll forming operation which provides distinct advantages. In general, the method of roll forming the hinge means comprises the steps of:

(1) Continuously moving a strip of coil stock through processing apparatus to form a hinge;

(2) Slotting the edges of the coil stock strip to define a plurality of slotted sections integrally connected by a common base section;

(3) Simultaneously bending a corner of alternate slotted sections of the coil stock strip to form an outwardly curved flap thereon;

(4) Passing the coil stock strip over a wedging means which deflects the slotted sections having the outwardly curved flaps to one side of the base section while the other slotted sections are deflected to the other side of the base section;

(5) Subsequently passing the coil stock between rollers of a rolling mill and further bending adjacent slotted sections in opposite directions, and subsequently;

(6) Progressively rolling the oppositely bent slotted sections around curved guide means until substantially cylindrical coaxial tubular portions are formed by each slotted section and each slotted section defines a cylindrical surface having the end thereof lying closely adjacent the base section.

In general, the manufacturing apparatus includes a press means which simultaneously slots the coil stock strip and forms the outwardly curved flaps on the slotted sections thereof. Guide means and wedging means receive the coil stock strip from the press means and guide the stock into a rolling mill and simultaneously bend alternate slotted sections in opposite directions relative to the base section to insure that the rollers of the rolling mill form alternate slotted sections in opposite directions. Guide means are provided in the rolling mill to conduct the coil stock strip between a plurality of rollers which progressively form the slotted sections into oppositely extending cylindrical shapes. The guide means are supported adjacent the coil stock and extend inwardly between the oppositely bent slotted sections while each slotted section is being gradually bent outwardly and a semi-cylindrical curvature is being formed on the innermost portions thereof. After the slotted sections have been outwardly displaced a predetermined amount, the end portions thereof are reversely bent inwardly toward one another to complete a cylindrical form. As the end portions are bent inwardly into cylindrical form, the guide means becomes a tapered rod of decreasing diameter which is internally supported within the slotted sections and extends continuously between the rollers until the tubular opening is completely formed.

It is contemplated that some of the principles of the present invention are applicable to hinge means which may be utilized in other environments than with vehicle visors wherein equal frictional retaining forces are desired in various hinge positions. It is contemplated that the frictional retaining forces may be unequalized if desired by varying the number of tubular portions or the lengths of the tubular portions so that the total surface area of engagement of tubular sections extending in one direction may be varied relative to the total surface area of engagement of tubular sections extending in the opposite direction whereby predetermined variations in frictional retaining forces may be obtained in various hinge positions. Furthermore, the method and apparatus for roll forming a tubular passage formed by adjacent oppositely extending, integrally connected, sections may be applied to other articles requiring the same structural features even though the ultimate use and function of the particular parts manufactured may be considerably different than the subject vehicular visor. Thus, other objects and advantages and uses of the principles of the invention will be apparent, or become apparent, by reference to the following detailed description and the accompanying drawing wherein:

FIGURE 1 is a side elevational view, with portions removed, of a hinge assembly embodying the principles of the present invention;

FIGURE 2 is an end view of the assembly shown in FIGURE 1 taken along the line 2—2;

FIGURE 3 is a sectional view taken along the line 3—3 in FIGURE 1;

FIGURE 4 is a sectional view taken along the line 4—4 in FIGURE 1;

FIGURE 5 is a diagrammatic illustration of apparatus for manufacturing the hinge means shown in FIGURE 1;

FIGURE 6 is a side elevational view of a portion of the apparatus shown in FIGURE 5;

FIGURE 7 is a plan view of a portion of a strip of sheet material from which a hinge is formed in an intermediate stage of manufacture;

FIGURE 8 is an enlarged partial view of a portion of the apparatus shown in FIGURE 6;

FIGURE 9 is a sectional view taken along the line 9—9 in FIGURE 6;

FIGURE 10 is a sectional view taken along the line 10—10 in FIGURE 6;

FIGURE 11 is a partial sectional view taken along the line 11—11 in FIGURE 6 and showing the configuration of the roller elements and the strip of sheet material at station No. 1 in FIGURE 5;

FIGURES 12–20 are partial sectional views similar to FIGURE 11 and showing the configuration of the roller elements and the strip of sheet material at each of the stations 2–10 in FIGURE 5;

FIGURE 21 is a plan view of portions of stations 4, 5 and 6 of FIGURE 5 illustrating guide means associated therewith;

FIGS. 22–26 are detail views of portions of guide means provided between stations 5 and 6.

Referring now to FIGURES 1–4, an illustrative visor hinge means is shown to be formed from a length of sheet material 10. In the illustrative embodiment, the sheet material is .024 gauge sheet steel; but other sizes and kinds of sheet material can also be utilized. The hinge means comprises a flange portion 12 which is provided with a longitudinally extending reinforcement rib 14. In use, a conventional visor member (not shown) is fixedly secured to the flange 12 by staples or any other suitable fastening means. The upper end of the flanged portion 12 terminates in a series of coaxial tubular portions 16, 18, 20 which are separated from one another by transversely extending slots 22, 24. It is to be understood that additional tubular portions may be provided as desired although only three are necessary for most visor applications. Each of the tubular portions is formed from slotted sections 26, 28, 30 integrally connected by a common base section on the original blank of sheet material 10 as shown in FIGURE 7. The tubular portion 16 is formed by bending the slotted section 26 circumferentially in one direction to form a cylindrical housing and the tubular portion 18 is formed by bending the slotted section 28 circumferentially in the opposite direction to form a coaxial cylindrical housing of equal diameter. The tubular portion 20 is formed by bending the slotted section 30 circumferentially in the same direction as the slotted section 26. In this manner, alternate tube portions are formed by bending the associated slotted sections of the sheet material blank in opposite directions. The outer ends 32, 34, 36 of the slotted sections terminate substantially adjacent the base section 12 so that the inner peripheral surface of each of the tubular portions extends substantially 360°. The term "substantially 360°" is intended to include spatial variations of the end portions relative to the flange portion which may result from manufacturing considerations; and, in general, will include variations between 270° and 360°. The end portions 32, 34, 36 are outwardly flared to prevent the edges of the end portions from binding with rod means to be inserted through the tubular portions.

The visor hinge is adapted to be slidably assembled on a rod means 40 or the like which is connected at its other end to conventional fastening means (not shown) for securing the visor assembly to the roof of a vehicle. The diameter of the tubular portions is less than the diameter of the rod 40 so that an interference fit of approximately between .010 inch and .014 inch is obtained. The interference fit can be varied to provide different degrees of tightness as desired. In the assembled position, the rod 40 has substantially equal frictional peripheral contact with similarly directed tubular portions. In other words, the surface contact area between the tubular portion 18 and the rod 40 is approximately equal to the surface contact area between the tubular portions 16, 20 and the rod 40. Since the tubular portions 16, 20 extend circumferentially in the same direction, and in the opposite direction to the tubular portion 18, frictional forces developed between the rod 40 and the tubular portion of the hinge during rotation of the hinge about the rod, and in various adjusted positions of the hinge relative to the rod, will be substantially equal regardless of the direction of rotation or the position of the hinge. The provision of equal and oppositely directed frictional characteristics during rotation of the visor and in each of the adjusted visor positions, provides improved operational results and a distinct advantage over the prior art as hereinbefore described. Since each of the tubular portions is substantially cylindrical, the rod means 40 is firmly supported about most of its periphery and the number of possible binding edges, which might contact the periphery of the rod means and "freeze" the visor hinge in a single position, are eliminated. The substantially complete peripheral surface engagement between the rod 40 and the tubular portions is particularly important during assembly of the rod with the hinge means. In general, such assemblies are automatically accomplished and the rod 40 is rammed through the tubular portions at a rapid rate. If insufficient peripheral contact is provided between the tubular portions and the rod, the rod may become misaligned relative to the central axis of the tubular portions and bend or otherwise damage the tubular portions during assembly.

The tubular portions 16, 18, 20 and the reinforcement groove 14 are formed in the sheet of material 10 by a roll-forming operation. The utilization of a roll-forming operation enables the tubular portions to be formed very closely to specified dimensions so that peripheral contact between the tubular portions and the rod will be substantially equal and uniform around the entire inner periphery of each of the tubular portions and between adjacent tubular portions. A hinge formed by a roll-forming operation provides distinct advantages over previous hinges formed by other types of forming operations, such as a stamping operation, in which the tendency of the tubular portions to spring back to their original flat configuration is very difficult to control and can often result in unequal peripheral engagement of the tubular portions with the rod means. Another aspect of the present invention relates to the manufacture of an integral, one piece, hinge means having a plurality of adjacent oppositely directed tubular portions which extend circumferentially substantially 360°, by a roll-forming operation.

A novel method and apparatus for manufacturing the aforedescribed hinge means is illustrated in FIGURES 5–21. Referring now to FIGURE 5, the manufacturing operation comprises, in general, continuous movement of a continuous strip of sheet material 10 from a coil of stock (not shown) through punch press means 50, rolling mill means 52 and cutoff press means 54. As shown in FIGURE 6, the punch press means 50 comprises a conventional upper platen 56 adapted to be reciprocably driven relative to a lower platen 58 which is fixedly supported on a base member 60. The upper platen 56 carries a plurality of conventional slotting means 62 which are adapted to form the slots 22, 24 and locating slots 64, 66 in the sheet metal strip 10. In addition, a special forming punch 68 is located above a corresponding spring mounted die plate 70 which is biased upwardly by spring elements 72 and movable downwardly against the spring elements as the forming punch 68 performs a forming operation on the continuously moving sheet metal strip 10. The forming punch 68, shown in FIGURE 8, is provided with a locating flang 74 which is adapted to be received within the slot 24 and an upwardly curved adjacent surface 76 which is adapted to form an outwardly curved flap 78 on the leading corner 80 of the slotted section 28. One of the slotting means 62 may be located at 81 along the side of punch 68. The strip 10 is moved the distance between the locating flange 74 and the first slotting means 62 between closing movements of the punch press 50 so that only alternate flanges are provided with upwardly curved flaps 78. The details of the rolling mill and the presses are conventional. The various forming operations performed by the press means 50 and the cutoff press 54 on the continuously moving strip are accommodated by conventional slide mechanism. Since such press operations are conventional and well known to those skilled in manufacturing, none of the conventional apparatus need be described in detail herein.

Referring now to FIGURES 6 and 9, as the strip of sheet material 10 moves from the punch press means 50 into the rolling mill 52, the strip passes through a guide block 84 which has a substantially flat upper guide surface 86 adapted to slidably engage and guide the upper surface of the sheet metal strip 10. Wedging and guide means 88 in the form of a block having a substantially flat upper surface 90 adn a downwardly and outwardly tapered lower surface 92 is fixedly secured relative to the moving sheet metal strip and spaced beneath the upper guide surface 86 so that the strip 10 and the slotted sections 26, 30 can pass between the guide surfaces 86, 90. The forward edge 94, shown in FIGURE 6, of the wedging means 88 is tapered inwardly and downwardly to provide a projection adapted to engage and guide the curved flap 78 downwardly over the lower surface 92 and thereby bend the slotted section 30 downwardly and outwardly relative to the slotted sections 28 and 32 along the dashed line 96 in FIGURE 7.

Referring now to FIGURES 6 and 11, rolling mill station No. 1 is shown to comprise an upper roller 110 rotatably driven on a horizontal shaft 112 and a lower roller 114 rotatably driven on a parallel shaft 116. An idle roll 118 is rotatably mounted on a vertical idler shaft 120. The continuously moving strip of sheet material 10 is received between the rolls and has a curved portion 122 formed in the base section by the rolls 110, 114. The slotted sections 28, 30 are further outwardly displaced by the idle roll 118. It is to be understood that the aforedescribed section of the strip of sheet material shows only the slotted sections 28, 30; and that the slotted section 26, and any additional slotted sections, would have a similar position and be operated upon in a similar manner. Referring now to FIGURES 6 and 10, another guide block 126 is fixedly secured to a support block 128 between the rolls at station No. 1 and station No. 2. The guide block 126 is provided with upper and lower intersecting inclined surfaces 130, 132 which extend inwardly into the path of movement of the strip of material 10 and are located between the slotted sections. The forward end 136 of the guide extends inwardly closely adjacent the idle roll 118 and tapers outwardly therefrom to provide an additional wedging action between the slotted portions as illustrated in FIGURE 6. The guide 126 terminates closely adjacent an idle roll 140, shown in FIGURE 12. The idle roll 140 has a tapered peripheral surface 142 which further expands the slotted sections away from one another in cooperation with an upper roll 142 and a lower roll 144 which form the reinforcement rib 14 and the flange portion 12. The strip of material next passes through an upper roll 148 and a lower roll 150 at station No. 3 as shown in FIGURE 13. An idle roll 152 at station 13 further outwardly displaces the slotted sections. The flange portion 12 of the strip of material is engaged by similarly configured portion of the rolls 148-150. It is to be understood that all of the succeeding rolls in the rolling mill have identical flange engaging portions and will not be hereinafter described in any detail. The strip of material passes next to station No. 4, as shown in FIGURE 14, and is engaged by an idle roll 154, and upper and lower rolls 156, 158. The rolls at station No. 4 begin to form curved inner surfaces 160, 161 on the slotted portions. Referring now to FIGURE 15, the strip of material is engaged by an upper roll 162 and a lower roll 164. A guide block 166 having a substantially semi-cylindrical inner surface 168 is fixedly secured adjacent the path of movement of the strip of material and extends inwardly between the lower slotted sections and the upper slotted sections. The rolls 162, 164 and the guide block 166 form partial cylindrical surfaces on each of the slotted sections over a peripheral distance of approximately 90°. Referring now to FIGURE 21, a portion 168 of the guide block 166 extends between station No. 5 and station No. 6. The guide block cross section changes form between the stations from the section of the block having a semi-cylindrical inner surface as shown in FIGURE 15 to a rod 170 having a cylindrical cross section. The rod 170 extends through an upper roller 174 and a lower roller 176 at station No. 6. The rollers 174, 176 are adapted to reversely bend the outer ends of each of the slotted portions into closed loops as shown in FIGURE 16. An additional guide block 178, shown in FIGURES 21-24, may be provided immediately adjacent the rolls 174, 176 and has a tapered leading edge 180 and a curved inner surface 181 which is adapted to guide the outer ends of the slotted sections into the cylindrical cavity defined by the forming rolls 174, 176. The rod portion 170 extends continuously from station No. 6 to the end of the rolling mill in the form of a plurality of abutting tapered rod sections 180, 182, 184, of gradually reduced diameters. Substantially similar upper and lower roller sets 188, 190, and 192, 194, and 196, 198, and 202, 204 are provided at stations 7 to 10, respectively, and continue the reverse bending of the slotted sections started at station No. 6, until the outer ends are completely circumferentially displaced around the rod elements and the slotted sections acquire a substantially cylindrical form as shown in FIGURE 20. The formed strip of material leaves the rolling mill 52 and appropriate lengths of the strip are severed in a conventional manner in the press 54 to obtain individual hinge means having the form illustrated in FIGURES 1-4.

It is contemplated that the particular configurations of the rolls and guide means at the various stations of the rolling mill can be varied to form the desired tubular configurations more quickly or more slowly and uniformly. Accordingly, additional rolling mill stations may be provided, or in some instances, a lesser number of rolling mill stations may be utilized. Other changes in the method and apparatus may be resorted to without departing from the inventive concepts hereinbefore disclosed. Thus, it is intended to include obvious modifications and changes in the details of the manufacturing method and apparatus, and other modifications, within the scope of the present invention, as defined by the appended claims, except insofar as limited by the prior art.

What is claimed is:

1. A method of manufacture of a hinge element or the like having a plurality of separate oppositely bent circumferentially extending flanges simultaneously formed in a strip of coil stock by roll-forming and comprising, in series, the steps of:
   (1) slotting the coil stock to provide said separate flanges;
   (2) forming an outwardly curved flap on one corner of alternate flanges;
   (3) wedging adjacent flanges in opposite directions to define an acute angle therebetween by inserting wedge means along the curve surface of said curved flap;
   (4) gradually and progressively enlarging the angle between alternate flanges by successive wedging operations;
   (5) moving said coil stock along back up means secured outwardly of and extending inwardly between said flanges and having an inner curved surface abuttingly engaged therewith;
   (6) progressively changing said back up means to a tapered rod having circular cross sections of decreasing diameter and located completely within and between the confines of said flanges; and
   (7) progressively rolling said flanges about said back up means until said alternate flanges extend in opposite directions substantially 360° to define a continuous coaxial cavity.

2. Apparatus for roll-forming adjacent slotted sections of a strip of sheet material in opposite directions into a cylindrical shape forming a coaxial tubular cavity extending between said slotted sections, and comprising: means to slot said strip of sheet material to form said slotted sections, means to bend a portion of alternate slotted sections outwardly away from the other slotted sections, means engageable with the outwardly bent portion of alternate slotted sections to bend adjacent slotted sections in opposite directions, and common means to roll-form each of said slotted sections into cylindrical shapes forming said coaxial tubular cavity.

3. The apparatus as defined in claim 2 and wherein guide means are provided to support said strip of material during roll-forming of said cylindrical shapes, a first portion of said guide means being fixedly secured outwardly of and extending into surface engagement with portions of the inner periphery of said slotted sections, and said first portion of said guide means gradually tapering into cylindrical means located inwardly of and supported entirely within said flanged portions during formation of said cylindrical shapes.

4. Roll-forming apparatus for forming a tubular cavity in a blank of material which comprises a plurality of separated sections integrally connected to a common base; and comprising: means to deflect alternate separated sections relative to the other separated sections, means to bend said alternate separated sections outwardly away from said other separated sections, subsequent means to roll-form a semi-cylindrical surface along the inner surfaces of said separated sections next adjacent said common base member, and means to thereafter reversely bend the outer surfaces of said separated sections toward and past one another into a cylindrical form forming a continuation of said first mentioned semi-cylindrical surface and defining therewith a cylindrical surface extending circumferentially substantially 360°.

5. A method of manufacture of a hinge element or the like having a plurality of separate oppositely bent circumferentially extending flanges simultaneously formed in a strip of coil stock by roll-forming and comprising, in series, the steps of:
(1) slotting the coil stock to provide said separate flanges;
(2) forming an outwardly curved flap on one corner of alternate flanges;
(3) wedging adjacent flanges in opposite directions to define an acute angle therebetween by inserting wedge means along the curved surface of said curved flap;
(4) gradually and progressively enlarging the angle between alternate flanges by successive wedging operations;
(5) and forming a curved cylindrical surface along the inner facing surfaces of said flanges extending substantially 360° from one side of the coil stock to the opposite side thereof whereby alternate flanges terminate on opposite sides of said coil stock.

6. The method of roll-forming a hinge having a tubular portion and comprising the step of:
(1) continuously moving a strip of coil stock through processing apparatus to form a hinge;
(2) slotting the edges of the coil stock strip to define a plurality of slotted sections integrally connected by a common base section;
(3) simultaneously bending a corner of alternate slotted sections of the coil stock strip to form an outwardly curved flap thereon;
(4) passing the coil stock strip over a wedging means which deflects the slotted sections having the outwardly curved flaps to one side of the base section while the other slotted sections are deflected to the other side of the base section;
(5) subsequently passing the coil stock between rollers of a rolling mill and further bending adjacent slotted sections in opposite directions, and subsequently;
(6) progressively rolling the oppositely bent slotted sections around curved guide means until substantially cylindrical coaxial tubular portions are formed by each slotted section and each slotted section defines a cylindrical surface having the end thereof lying closely adjacent the base section.

References Cited by the Examiner
UNITED STATES PATENTS

| | | | |
|---|---|---|---|
| 442,656 | 12/90 | Whittlesey | 29—11 |
| 738,266 | 9/03 | Weiss | 29—11 |
| 1,604,229 | 10/26 | Kellogg | 29—11 |

RICHARD H. EANES, JR., *Primary Examiner.*